United States Patent
Bendel

(10) Patent No.: US 10,344,800 B1
(45) Date of Patent: Jul. 9, 2019

(54) BEARING FOR A TUBE SHAFT OF A BANDSAW-BLADE TWISTER

(71) Applicant: Albrecht BAEUMER GmbH & Co. KG Spezialmaschinenfabrik, Freudenberg (DE)

(72) Inventor: Andreas Bendel, Freudenberg (DE)

(73) Assignee: ALBRECHT BAEUMER GMBH & CO. KG SPEZIALMASCHINENFABRIK, Freudenberg (DE)

(*) Notice: Subject to any disclaimer, the term of this patent is extended or adjusted under 35 U.S.C. 154(b) by 294 days.

(21) Appl. No.: 15/440,804

(22) Filed: Feb. 23, 2017

(30) Foreign Application Priority Data

Mar. 23, 2016 (DE) .................. 10 2016 204 817

(51) Int. Cl.
| | |
|---|---|
| *F16C 35/06* | (2006.01) |
| *F16C 19/54* | (2006.01) |
| *B27B 13/06* | (2006.01) |
| *B23D 55/08* | (2006.01) |

(52) U.S. Cl.
CPC .......... *F16C 19/546* (2013.01); *B23D 55/082* (2013.01); *B27B 13/06* (2013.01); *F16C 35/061* (2013.01); *F16C 2322/34* (2013.01)

(58) Field of Classification Search
CPC .. F16C 19/541–543; F16C 19/546–548; F16C 35/061; F16C 2322/34; B27B 13/06; B23D 55/082
See application file for complete search history.

(56) References Cited

U.S. PATENT DOCUMENTS

| | | | | |
|---|---|---|---|---|
| 1,459,933 | A | * | 6/1923 | Stauder ................ B23D 53/045 83/796 |
| 4,030,386 | A | | 6/1977 | Poetzsch |
| 5,050,472 | A | | 9/1991 | Poetzsch |
| 6,386,083 | B1 | * | 5/2002 | Hwang ................. B26F 1/3833 83/651.1 |
| 6,868,765 | B2 | | 3/2005 | Poetzsch |

FOREIGN PATENT DOCUMENTS

| | | | |
|---|---|---|---|
| DE | 2462533 B | | 6/1977 |
| EP | 738569 A1 | | 5/1995 |
| EP | 0738569 B | | 10/1999 |
| JP | S48-19941 A | | 3/1973 |
| JP | 2004204913 | * | 7/2004 |
| WO | 2005/005087 A1 | | 7/2003 |

* cited by examiner

*Primary Examiner* — James Pilkington
(74) *Attorney, Agent, or Firm* — Andrew Wilford

(57) ABSTRACT

A slotted tube shaft carrying a blade head of a blade twister rotates in a slotted, stationary bearing housing for an endless band-shaped cutting or sawing element supported by two axially spaced subassemblies each having C-shaped, axially spaced, and slotted inner and outer bearing washers radially between the slotted stationary bearing housing and the slotted tube shaft. The inner and outer washers are fixed in the stationary bearing housing against rotation relative thereto with slots of the stationary bearing housing and washers radially aligned with one another. Respective sets of at least three roller bearings centered on and angularly distributed about the axis and fixed against angular movement between each of the inner washers and the respective outer washer. Each roller bearing radially outwardly engages the slotted stationary bearing housing and radially inwardly engages the tube shaft.

8 Claims, 3 Drawing Sheets

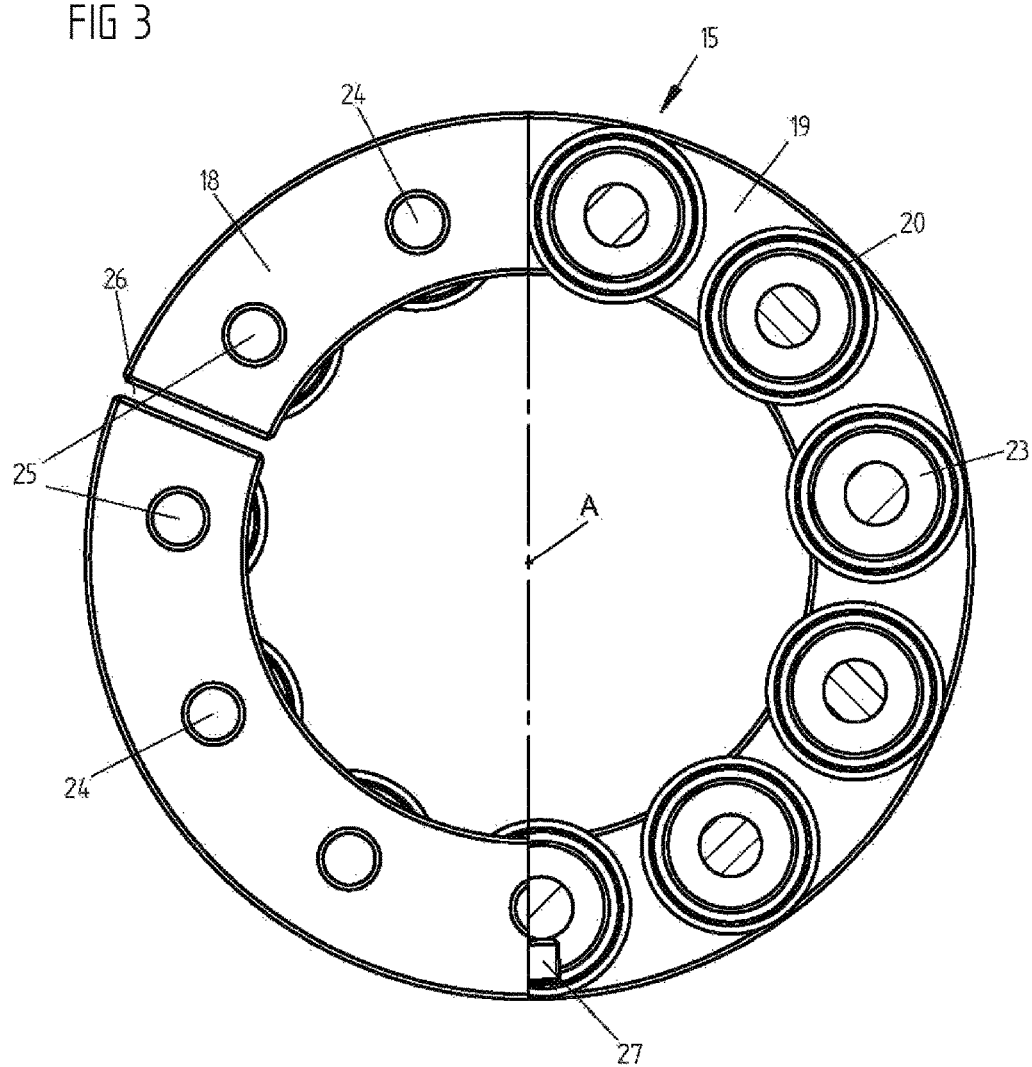

a# BEARING FOR A TUBE SHAFT OF A BANDSAW-BLADE TWISTER

FIELD OF THE INVENTION

The present invention relates to a bearing assembly. More particularly this invention concerns a bearing for a tube shaft of a blade twister of a bandsaw.

BACKGROUND OF THE INVENTION

A typical bearing assembly for a slotted tube shaft of a head of a bandsaw-blade twister is rotatably mounted in a slotted, stationary bearing housing for an endless, self-contained, band-shaped cutting or sawing element, typically a bandsaw blade. Such bearing assemblies are used for contour or shape-cutting machines with blade twisters that are rotated to align the blade in the cutting direction.

In endless welded bandsaw blades of contour-cutting machines, the blade must be moved along the axis of rotation of the blade twister for cutting. This is only possible if, for example, the blade is threaded through the twisters, then welded in the machine or, alternatively, if the blade twister that positions the blade in the cutting direction has a mounting opening, for example a slot allowing the blade to be moved perpendicular to the twist axis into the blade twister.

It is generally known to allow the tube shaft to rotate in a slide bearing as a simple construction within a bearing housing. Drawbacks of the slide bearing are the different thermal expansion values of metal and plastic, sliding friction with a high stick-slip effect, and the danger of contamination.

U.S. Pat. No. 6,868,765 describes a shape-cutting machine, particularly for foam, with a workpiece table having a transverse table gap and a drive for moving workpieces longitudinally past the table gap. The workpieces are cut using an endless cutting element, for example an endless bandsaw blade that passes through the table gap, is tensioned by wheels, and can be driven in the vertical direction through a cutting area by a drive. In order to enable different contour cuts to be executed using an endless blade, the blade must be twisted in the cutting area according to the desired curve, and a blade twister is provided for this purpose that has two blade heads. The blade is guided through the blade heads such that the cutting edge of the blade passes precisely through the axis of rotation of the two blade heads.

EP 0 738 569 B1 describes a vertical contour cutting machine with two blade twisters for rotating a blade and that are each provided with drivable, slotted tube shafts and blade guides each having two guide rollers and a brace roller as well as a scraper. The slots allow the endless welded blade to be easily introduced laterally to a position extending along the axis of rotation of the blade twister. The tube shaft is held in a housing against radial and axial displacements by rollers for supporting and bracing the tube shaft.

OBJECTS OF THE INVENTION

It is therefore an object of the present invention to provide an improved bearing for a tube shaft of a rotary blade twister.

Another object is the provision of such an improved bearing for a tube shaft of a rotary blade twister that overcomes the above-given disadvantages, in particular that avoids the above-mentioned drawbacks and provides a precise, smoothly operating bearing.

SUMMARY OF THE INVENTION

The invention is an improvement on a bearing assembly for a slotted tube shaft of a blade head of a blade twister rotatable about an axis in a slotted, stationary bearing housing for an endless, self-contained, band-shaped cutting or sawing element. According to the invention the bearing comprises at least two subassemblies and has have at least two pairs of axially spaced C-shaped and slotted inner and outer bearing outer washers between the slotted housing and the slotted tube shaft. An anchor structure is provided for retaining the washers in the housing with slots of the housing and washers radially aligned with one another. At least three roller bearings centered on and angularly distributed about the axis are fixed against angular movement between the washers of each of the pairs. Each roller bearing radially outwardly engages the slotted housing and radially inwardly engages the tube shaft.

As a result of this type of support by roller bearings, one obtains a stable, extremely smooth, very precise and durable bearing assembly.

The bearing assembly according to the invention can be used in all cutting devices in which the blade must be rotated, for example in horizontal or vertical contour cutting machines.

In accordance with the invention ball bearings, particularly angular contact ball bearings.

The subassemblies according to the invention each have an odd number of roller bearings, preferably eleven roller bearings.

According to the invention a slotted spacer ring a provided between the subassemblies can be positioned and secured against rotating by at least one anchor screw projecting radially through the fixed housing.

Advantageously, the roller bearings are held by cylindrical shafts between the bearing washers and of which at least two extend axially from the respective subassemblies so that they can be anchored relative to the housing. The long cylindrical anchor shafts engage in the rotationally fixed spacer ring, thereby preventing the bearing washers from rotating counter to one another.

It is noteworthy when shim rings are disposed between the two bearing washers.

BRIEF DESCRIPTION OF THE DRAWING

The above and other objects, features, and advantages will become more readily apparent from the following description, reference being made to the accompanying drawing in which:

FIG. 1 is a side view of a blade twister for a bandsaw or the like;

FIG. 3 is an end view partly in cross section through the structure of FIG. 2.

SPECIFIC DESCRIPTION OF THE INVENTION

Figure 1:
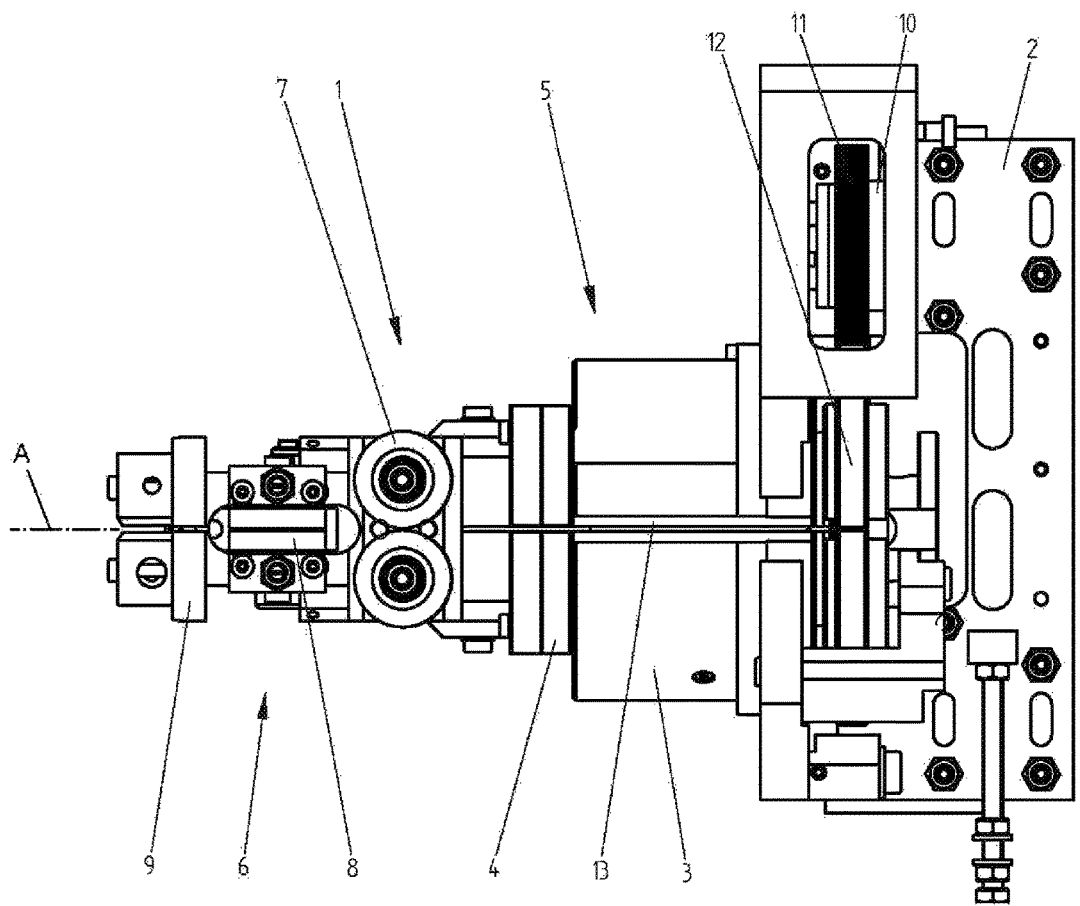

FIG. 1 shows one of two blade heads 1 of a blade twister for an endless-belt cutting or sawing element, an endless bandsaw blade such as those used in a vertical contour-cutting machine according to U.S. Pat. No. 6,868,765. A slotted bearing housing 3 in which a slotted tube shaft 4 is rotatably mounted is bolted to a support 2 formed by a machine frame so as to form a blade twister 5.

A blade guide 6 with two guide rollers 7, at least one brace roller 8, and a scraper 9 are mounted on the tube shaft 4. A servomotor 10 acts through a drive pinion 11 and a gear wheel 12 to rotate the slotted tube shaft 4 and thus also the blade guide 6 to orient it in the desired cutting direction of the unillustrated belt blade held by the blade guide 6. The blade is guided through the blade heads 1 such that the cutting edge of the blade lies precisely on the axis A of rotation of the two blade heads 1.

Figure 2:
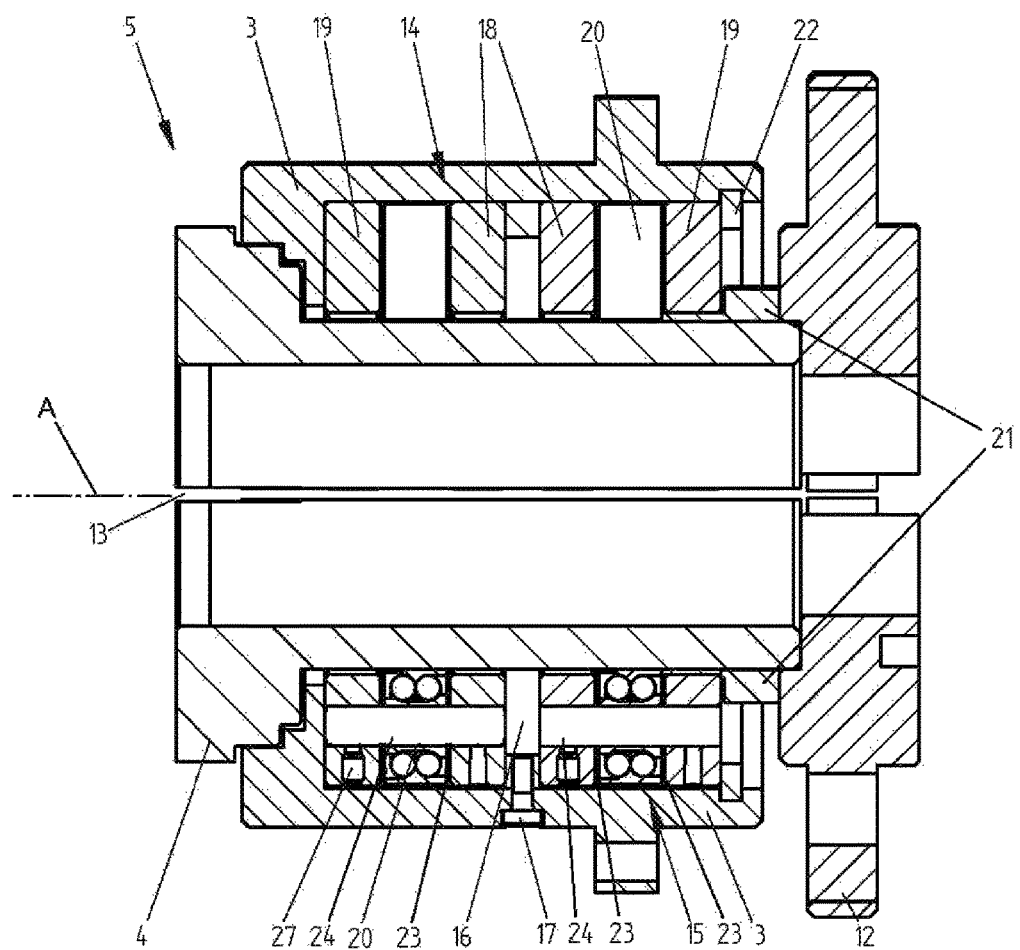
FIG. 2 is an axial section through the bearing according to the invention.

FIG. 2 shows in longitudinal section the rotary drive 5 for the twister 5, provided with the rotatable bearing housing 3 and the rotatable tube shaft 4, each of which has an axially throughgoing slot 13. In the starting position these slots 13 are aligned with each other such that an endless blade can be introduced from the outside through the slot 13 into the interior of the tube shaft 4 and aligned to the axis A of rotation of the blade heads 1 for cutting.

The bearing housing 3 and the tube shaft 4 are supported on each other by a slotted bearing assembly 14 so as to be rotatable in relation to one another. The bearing assembly 14 has two subassemblies 15 that are kept apart axially by a spacer ring 16. The spacer ring 16 is positioned and secured against rotating by screws 17, the spacer ring 16 and the screws 17 together forming an anchor. The subassemblies 15 each consist of an inner bearing washer 18 and an outer bearing washer 19, between which are arranged roller bearings, for example angular contact ball bearings 20, as bearing elements. The inner bearing washers 18 each face toward the spacer ring 16. A locking ring 21 secures the bearing housing 3 and the subassemblies 15 to the tube shaft 4, and a retaining snap ring 22 is used to secure the bearing assembly 14 in the housing 3.

FIG. 3 shows a bearing unit 15. The left side of FIG. 3 shows the plane behind the spacer ring 16 directly in front of an inner bearing washer 18, and the right side shows the plane directly behind the inner bearing washer 18 and in front of the bearing elements 20. In this example, eleven angular contact ball bearings 20 forming the bearing elements are provided between the inner and outer bearing washers 18 and 19 that are in turn axially flanked by respective pairs of shim rings 23. Nine of the eleven angular contact ball bearings 20 are carried on respective short cylindrical axle shafts 24 and the other two on two long cylindrical shafts 25 that engage in holes of the bearing washers 18 and 19. The long cylindrical shafts 25 project out of the inner bearing washer 18 and engage in respective holes of the spacer ring 16 to as to inhibit rotation of the washers 18 and 19 relative to each other. This ensures that the slots 26 of the C-shaped bearing washers 18 and 19 that are necessary for the installation of the blade and of the spacer ring 16 are always axially aligned with one another and cannot be rotated against one another. In FIG. 3, the long cylindrical shafts 25 are shown in the immediate area of the slot 26.

Only during the installation of the subassemblies 15 and the assembly of the blade heads 1, it must be ensured that all of the slots 13 and 26 are aligned in the starting position in order to enable insertion of an endless blade from the outside through the slots 13 and 26 into the interior of the two blade heads 1 and positioning on the axis A of rotation.

For the purpose of the precise adjustment of the angular contact ball bearings 20, threaded screws 27 are provided in the bearing washers 18 and 19 that act in inwardly aligned fashion on the cylindrical shafts 24 and 25 and press the angular contact ball bearings 20 against the tube shaft 4 inside the subassemblies 15, thereby resulting in a nearly backlash-free supporting of the tube shaft 4 in the bearing housing 3.

Any number of angular contact ball bearings 20 equal to or greater than three can be used. In terms of stability and durability, however, eleven angular contact ball bearings 20 appear to be expedient and not over-dimensioned. Such a larger number of angular contact ball bearings 20 has the advantage that the slot 13 of the tube shaft 4 is rolled over smoothly.

In summary, it should be noted that, by virtue of the present object of the invention, a blade head 1 of a blade twister with a slotted design for endlessly welded bandsaw blades of contouring machines is made possible by a slotted bearing assembly 14 with angular contact ball bearings 20.

The blade twister consists of a stationary, slotted bearing housing which is screwed into the machine frame and serves to receive the entire blade twister. A rotatably mounted and slotted inner shaft, the tube shaft 4, is provided in the bearing housing that can be rotated by means of the servomotor 10 acting on the gear wheel 12, thereby positioning the blade guide 6 according to the cutting direction. The specially constructed, slotted bearing assembly 14 is stable, extremely smooth, very precise, and durable. The also slotted spacer ring 16 is secured against rotating by the two screws 17. This ring 16 keeps the two subassemblies 15 spaced axially apart and secures the two inner bearing washers 18 with the long cylindrical shafts 25 against rotation.

The two subassemblies 15 also each have an outer slotted bearing washer 19 for receiving the cylindrical shafts 25 and 26, an inner slotted bearing washer 18 that acts as a closure for the bearing unit, and eleven angular contact ball bearings 20 with shim rings 23 that ensure that space is maintained between the two bearing washers 18 and 19 and the angular contact ball bearings 20. Support is provided to the inner ring of the angular contact ball bearings 20, which thereby additionally prevent rotation of the inner rings of the angular contact ball bearings 20. Moreover, the short cylindrical shafts 24 whose lengths correspond to the axial width of the subassemblies 3 and two long cylindrical shafts 25 are provided that project intentionally out of one side of the subassemblies 3 and act together with the spacer ring 16 to prevent relative angular movement between the bearing subassemblies 15 and the housing 3 as anti-torsion means.

I claim:

1. A bearing assembly for a slotted tube shaft carrying a blade head of a blade twister for rotation about an axis of a slotted stationary bearing housing for an endless band-shaped cutting or sawing element, the bearing assembly comprising at least two axially spaced subassemblies each in turn comprising:
   a C-shaped and slotted outer bearing washer radially between the slotted stationary bearing housing and the slotted tube shaft;
   a C-shaped and slotted inner bearing washer axially spaced from the outer bearing washer and radially between the slotted stationary bearing housing and the slotted tube shaft;
   an anchor retaining the inner and outer washers in the slotted stationary bearing housing against rotation relative thereto with slots of the slotted stationary bearing housing and rings washers radially aligned with one another; and
   a set of at least three roller bearings centered on and angularly distributed about the axis and fixed against angular movement between the inner washers and the outer washer, each roller bearing engaging radially outwardly engaging on the slotted stationary bearing housing and radially inwardly engaging on the slotted tube shaft.

2. The bearing assembly defined in claim 1, wherein the roller bearings are ball bearings.

3. The bearing assembly defined in claim 1 wherein the roller bearings are angular contact ball bearings.

4. The bearing assembly defined in claim 1, wherein each subassembly has an odd number of the roller bearings.

5. The bearing assembly defined in claim 4, wherein each subassembly has eleven of the roller bearings.

6. The bearing assembly defined in claim 1, wherein the anchor include:
   a slotted spacer ring, and
   screws fixing the spacer ring against rotation relative to the slotted tube shaft and located between the subassemblies.

7. The bearing assembly defined in claim 6, wherein each of the roller bearings includes a respective axle shaft, at least one of the axle shafts of each subassembly extending axially into the spacer ring.

8. The bearing assembly defined in claim 1, further comprising:
   shim rings between each of the bearing washers and the respective roller bearings.

* * * * *